(12) United States Patent
Lee et al.

(10) Patent No.: US 8,439,549 B2
(45) Date of Patent: May 14, 2013

(54) DISPLAY DEVICE

(75) Inventors: Chao-Chang Lee, New Taipei (TW); Yuan Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 233 days.

(21) Appl. No.: 13/109,182

(22) Filed: May 17, 2011

(65) Prior Publication Data

US 2012/0039091 A1 Feb. 16, 2012

(30) Foreign Application Priority Data

Aug. 11, 2010 (CN) .......................... 2010 1 0250873

(51) Int. Cl.
*F21V 7/04* (2006.01)

(52) U.S. Cl.
USPC .......... 362/632; 362/97.1; 362/623; 362/624; 362/633; 362/634; 349/58

(58) Field of Classification Search .................... 349/58, 349/60, 65; 362/97.1–97.3, 623, 624, 632–634
See application file for complete search history.

(56) References Cited

U.S. PATENT DOCUMENTS

| 7,121,710 B2 * | 10/2006 | Kim et al. ..................... 362/632 |
| 8,373,817 B2 * | 2/2013 | Arihara ......................... 349/58 |
| 2003/0164903 A1 * | 9/2003 | Saito et al. ..................... 349/58 |

* cited by examiner

*Primary Examiner* — Stephen F Husar
(74) *Attorney, Agent, or Firm* — Altis Law Group, Inc.

(57) ABSTRACT

A display device includes a top housing, a bottom housing, and a display module. The top housing is engaged with the bottom housing. The bottom housing includes a base and a fixing frame. The base and the fixing frame are integrally formed, and cooperatively define a receiving space. The fixing frame includes a reflective inner side surface. The display module is received in the receiving space. The reflective inner side surface reflects the light emitting from the side surface of the display module to the inner portion of the display module.

10 Claims, 4 Drawing Sheets

DISPLAY DEVICE

CROSS-REFERENCE TO RELATED APPLICATIONS

This application is related to one co-pending U.S. patent application, which is: application Ser. No. 13/096,216, entitled "DISPLAY DEVICE". Such application has the same assignee as the instant application and is concurrently filed herewith. The disclosure of the above-identified application is incorporated herein by reference.

BACKGROUND

1. Technical Field

The present disclosure relates generally to display devices.

2. Description of Related Art

A display device includes a housing, and a display module received in the housing. The display module includes a light source, a light guide plate, a reflecting sheet, a prism sheet, a diffusion sheet, a display panel, and a fixing frame. The light source is placed beside the light guide plate. The reflecting sheet is sandwiched between the light guide plate and the fixing frame, to reflect the light emitting from the bottom surface of the light guide plate to the inner portion of the light guide plate, such that the efficiency of light energy utilization may be improved. The prism sheet, the diffusion sheet and the display panel are stacked on the light guide plate in that order. However, the assembly process of the display device is complicated, and the display device is relatively thick because too many components are stacked together.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
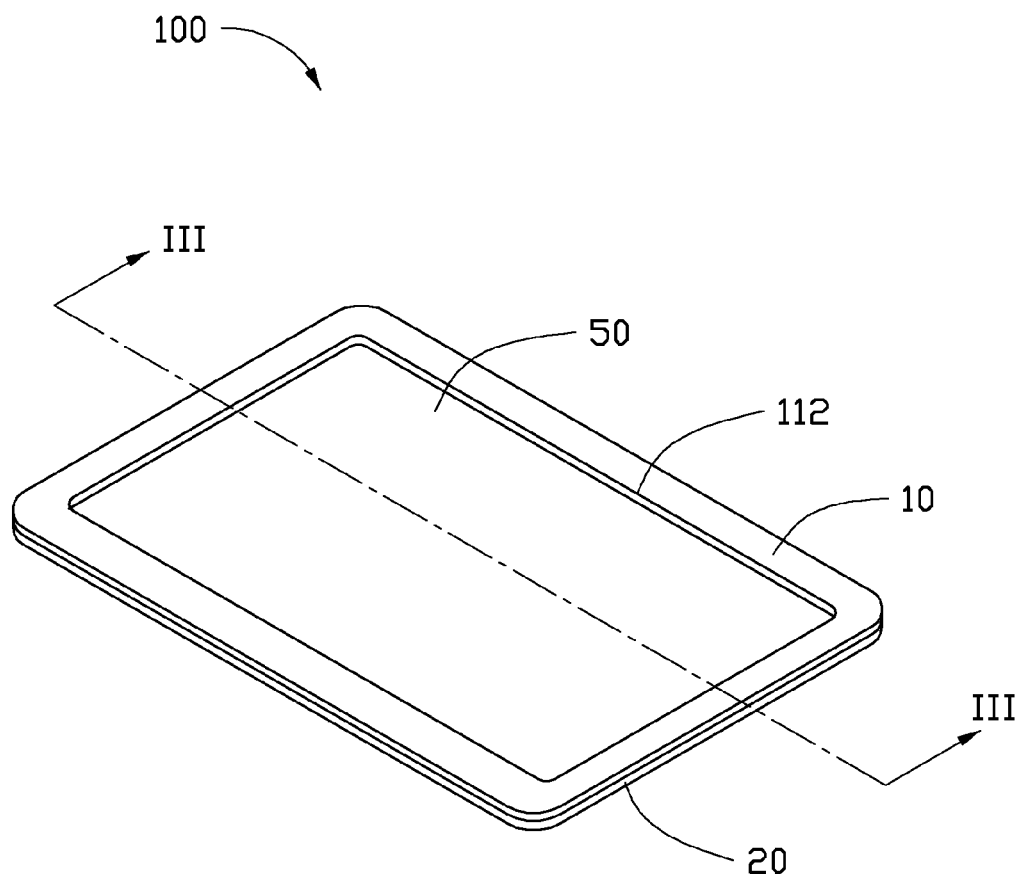
FIG. 1 is an isometric view of a first embodiment of a display device.

Referring to FIG. 1, a first embodiment of a display device 100 is employed, for example, in a portable computer, a mobile phone, or a tablet computer. The display device 100 includes a top housing 10, a bottom housing 20, a display module 30, a buffer 40, and a glass plate 50. The top housing 10 is engaged with the bottom housing 20. In this embodiment, the top housing 10 is a rectangular frame. A rectangular display opening 112 is defined in the top housing 10, such that the display module 30 can display images through the display opening 112. The buffer 40 and the glass plate 50 are stacked on the display module 30 in that order.

Figure 2:
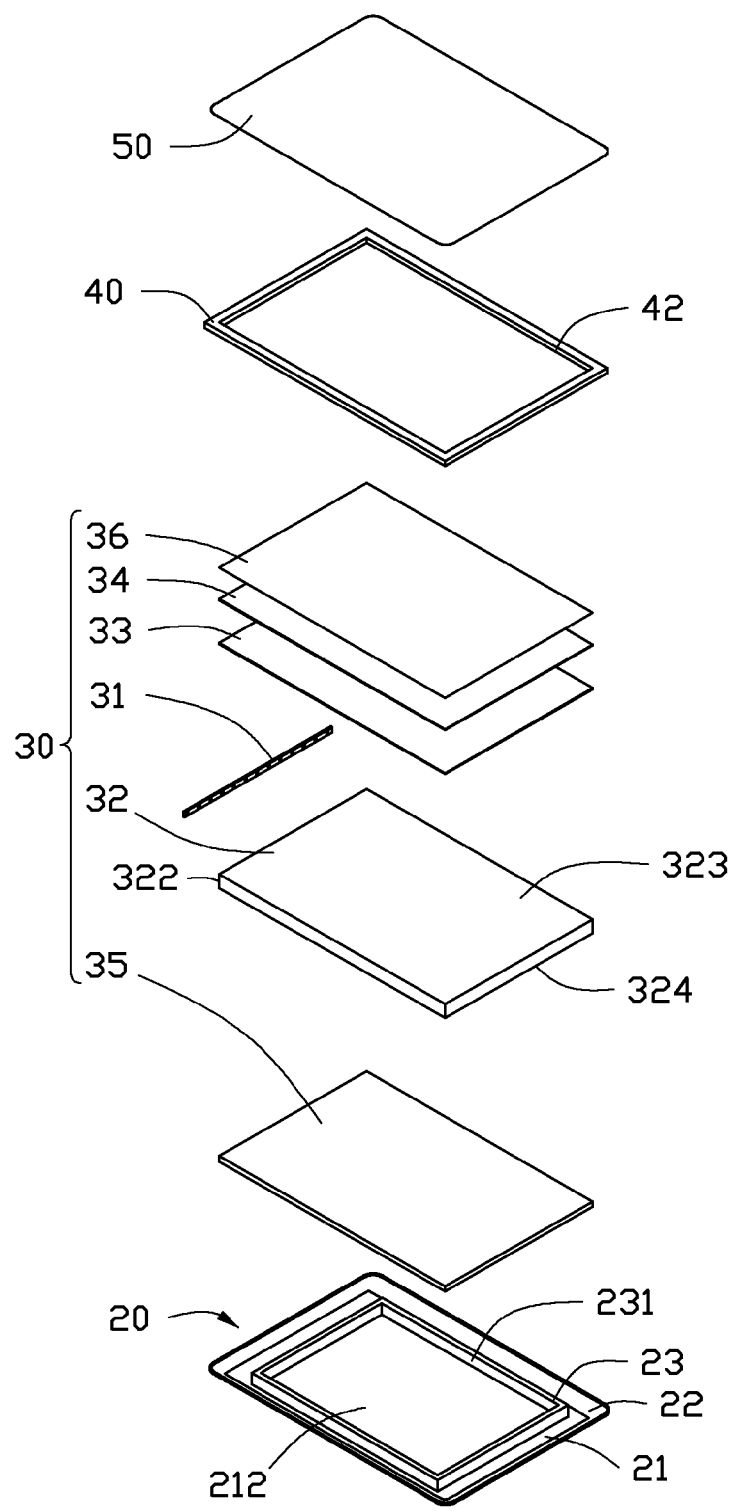
FIG. 2 is an exploded, isometric view of the display device of FIG. 1.
Figure 3:
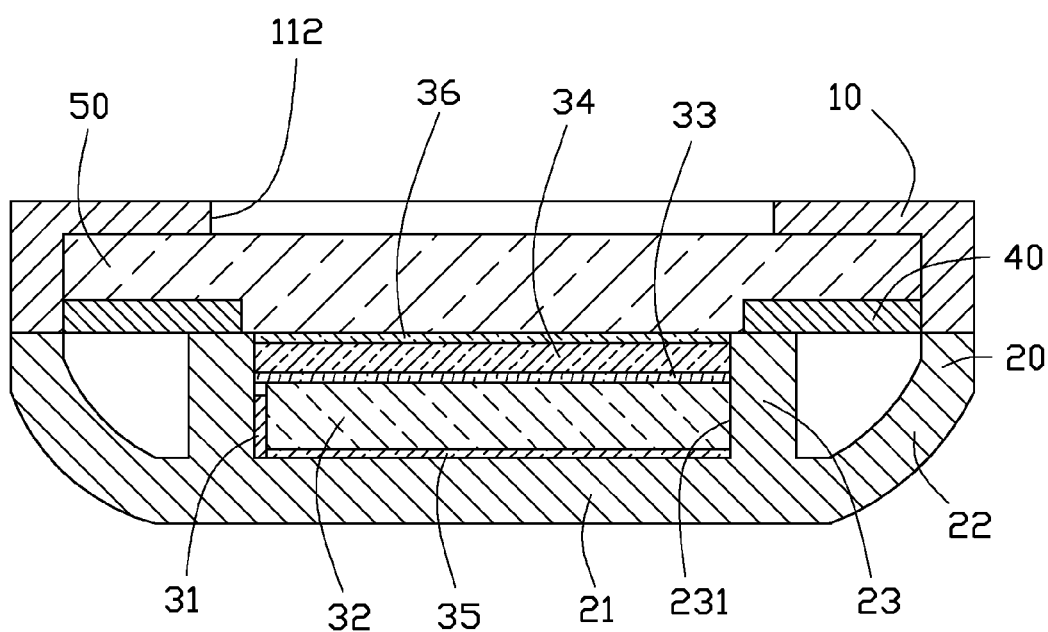
FIG. 3 is a cross-section view of the display device of FIG. 1, taken along line III-III.

Referring to FIGS. 2 and 3, the bottom housing 20 includes a base 21, a periphery wall 22 extending from the periphery of the base 21, and a fixing frame 23 formed on the base 21. The base 21, the periphery wall 22, and the fixing frame 23 are integrally formed. The base 21 and the fixing frame 23 cooperatively define a receiving space 212. The receiving space 212 is fit for receiving the display module 30. The fixing frame 23 includes a reflective inner side surface 231. The reflective inner side surface 231 is opposite to the side surface of the display module 30 to reflect the light emitting from the side surface of the display module 30 to the inner portion of the display module 30, such that the efficiency of light energy utilization may be improved.

The fixing frame 23 perpendicularly extends from the base 21. The bottom housing 20 is made of metal material which can reflect the light. The base 21 and the fixing frame 23 are formed integrally by die-casting or computerized numerical control (CNC).

Referring to FIG. 2 again, the display module 30 includes a light source 31, a light guide plate 32, a prism sheet 33, a diffusion sheet 34, a reflecting sheet 35, and a display panel 36. A conventional special plastic frame used to shield the light emitting from the side surface, and a metal frame used for fixing the above-mentioned components can be omitted.

The light guide plate 32 includes a light input surface 322, a light output surface 323, and a bottom surface 324. The light input surface 322 is connected to the light output surface 323. The bottom surface 324 is opposite to the light output surface 323. The light source 31 includes one or more light emitting diodes (LEDs), and is adjacent to the light input surface 322. The prism sheet 33, the diffusion sheet 34, and the display panel 36 are stacked on the light guide plate 32 in that order. The light emitting from the light source 31 passes through the light input surface 322 and enters the light guide plate 32, and then one part of the light emits from the light output surface 323 to the display panel 36, and the other part of the light emits from the bottom surface 324. The reflecting sheet 35 is placed below the bottom surface 324 of the light guide plate 32, to reflect the light emitting from the bottom surface 324 to the inner portion of the light guide plate 32. The display module 30 is received in the receiving space 212, and adhered to the reflective inner side surface 231 of the fixing frame 23 via adhesive.

The buffer 40 is a frame made of elastic material, for example, a frame made of rubber. The buffer 40 is placed on the fixing frame 23, and defines a light output opening 42 corresponding to the display module 30, such that the display module 30 can display an image through the light output opening 42. The buffer 40 can protect the glass plate 50 from damage. The buffer 40 is a black plastic frame, and the sides of the bottom surface of the glass plate 50 cannot be printed in black.

In assembly of the display device 100, first, the light source 31 is adhered to the reflective inner side surface 231 of the bottom housing 20. Second, the reflecting sheet 35, the light guide plate 32, the prism sheet 33, the diffusion sheet 34, and the display panel 36 are stacked in the fixing frame 23, and are adhered to the reflective inner side surface 231, and then the light input surface 322 of the light guide plate 32 is opposite to the light output surface of the light source 31, the reflective inner side surface 231 is opposite to the side surface of the display module 30, such that the light emitting from the side surface of the display module 30 can be reflected to the inner portion of the display module 30. Third, the buffer 40 is placed on the fixing frame 23, and then the glass plate 50 is adhered to the top housing 10 to press on the buffer 40. And last, the top housing 10 is engaged with the bottom housing 20 to finish the assembly of the display device 100.

Because the base 21 and the fixing frame 23 are integrally formed to receive the display module 30, and the display module 30 is adhered to the fixing frame 23, the light emitting from the sides of the display module 30 can then be reflected to the inner portion of the display module 30, therefore, a conventional fixing frame used for fixing the display module, and a conventional plastic frame used for shielding the light emitting from the sides of the display module can be omitted, and thus the display device 100 has less components, and the space of the bottom housing 20 is fully utilized, such that the display device 100 has simpler and thinner structure with a lower cost.

Figure 4:
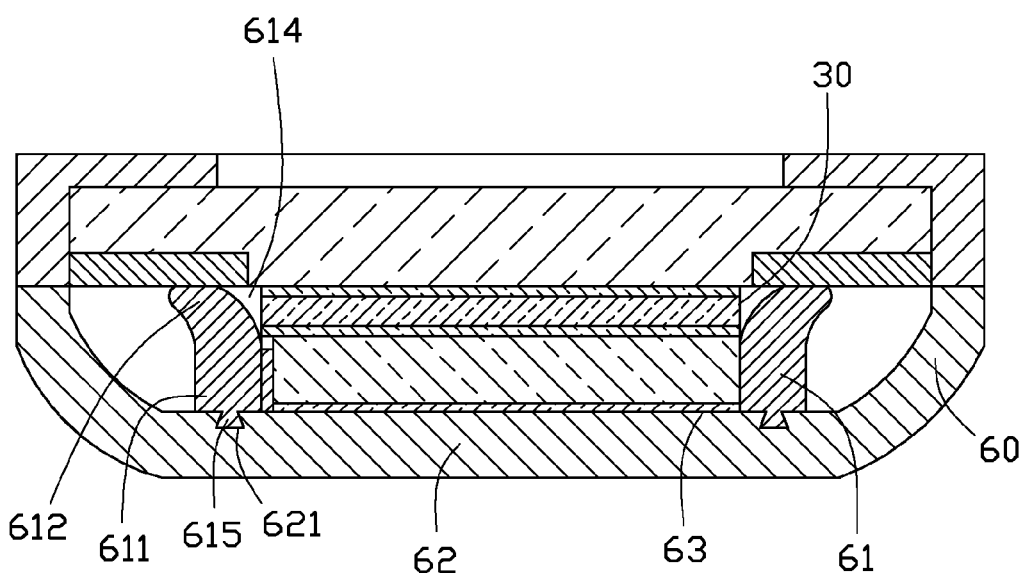
FIG. 4 is a cross-section view of a second embodiment of a display device.

Referring to FIG. 4, in a second embodiment, a display device similar to the first embodiment of the display device 100 is shown. However, the fixing frame 61 of the bottom housing 60 includes a bottom portion 611 and a top portion 612. The bottom portion 611 is connected to the base 62. The top portion 612 is formed on the end of the bottom portion 611, away from the base 62. The top portion 612 extends to the outside of the display module 30, and defines a mounting opening 614 along the direction perpendicular to the base 62. The size of the mounting opening 614 is greater than the size of the display module 30, such that the above-mentioned components of the display module 30 can be easily placed in the receiving space 63. The base 62 is made of metal material. The fixing frame 61 is made of plastic material. The base 62 and the fixing frame 61 are formed integrally by insert molding. A dovetail latching groove 621 is defined on the base 62. After the fixing frame 61 is molded with the base 62, a latching portion 615 engaged with the latching groove 621 is formed on the fixing frame 61, such that the fixing frame 61 and the base 62 are tightly formed together.

The fixing frame 61 and the base 62 can be made of plastic material. If the fixing frame 61 and the base 62 can reflect light, for example, they are white in color, then the fixing frame 61 and the base 62 are formed integrally by injection molding. If the fixing frame 61 and the base 62 are made of different plastic materials with different colors, the fixing frame 61 and the base 62 are then formed integrally by double-shot injection molding.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A display device, comprising:
   a top housing;
   a bottom housing engaged with the top housing, the bottom housing comprising a base and a fixing frame integrally formed with the base, the base and the fixing frame cooperatively defining a receiving space, and the fixing frame comprising a reflective inner side surface; and
   a display module, wherein the display module being received in the receiving space, and the reflective inner side surface reflecting the light emitting from the side surface of the display module to the inner portion of the display module.

2. The display device of claim 1, wherein the display device further comprises a buffer placed on the fixing frame, and a glass plate is pressed on the buffer.

3. The display device of claim 2, wherein the buffer is a black plastic frame.

4. The display device of claim 1, wherein the fixing frame extends perpendicularly from the base.

5. The display device of claim 1, wherein the fixing frame comprises a bottom portion, the bottom portion is connected to the base, and a top portion formed on the end of the bottom portion, and away from the base, and a mounting opening is defined on the top portion along the direction perpendicular to the base.

6. The display device of claim 1, wherein the base is made of metal material, the fixing frame is made of plastic material, and the base and the fixing frame are integrally formed by insert molding.

7. The display device of claim 6, wherein a latching groove is defined on the base, and a latching portion engaged with the latching groove is formed on the fixing frame after the fixing frame and the base are molded together.

8. The display device of claim 1, wherein the base and the fixing frame are made of different plastic materials with different colors, and the base and the fixing frame are formed integrally by double-shot injection molding.

9. The display device of claim 1, wherein the display module comprises a light source, a light guide plate, a reflecting sheet, a prism sheet, a diffusion sheet, and a display panel, the light guide plate comprises a light input surface, a light output surface connected to the light input surface, and a bottom surface opposite to the light output surface, the light source is adjacent to the light input surface, and the prism sheet, the diffusion sheet, the display panel are stacked on the light output surface, and the reflecting sheet is placed below the bottom surface.

10. The display device of claim 9, wherein the light source comprises one or more light emitting diodes.

\* \* \* \* \*